US012699183B2

(12) United States Patent
Kuehnle et al.

(10) Patent No.: US 12,699,183 B2
(45) Date of Patent: Aug. 4, 2026

(54) METHOD FOR DETERMINING AN AIR TEMPERATURE WITH AN ULTRASONIC SENSOR SYSTEM, METHOD FOR DETERMINING A DISTANCE WITH AN ULTRASONIC SENSOR SYSTEM AND ULTRASONIC SENSOR SYSTEM

(71) Applicant: Robert Bosch GmbH, Stuttgart (DE)

(72) Inventors: Goetz Kuehnle, Ludwigsburg (DE); Wilhelm Christopher Von Rosenberg, Munich (DE)

(73) Assignee: Robert Bosch GmbH, Stuttgart (DE)

( * ) Notice: Subject to any disclaimer, the term of this patent is extended or adjusted under 35 U.S.C. 154(b) by 313 days.

(21) Appl. No.: 18/532,337

(22) Filed: Dec. 7, 2023

(65) Prior Publication Data

US 2024/0201370 A1     Jun. 20, 2024

(30) Foreign Application Priority Data

Dec. 16, 2022    (DE) ..................... 10 2022 213 744.2

(51) Int. Cl.
G01S 7/539          (2006.01)
G01S 15/10          (2006.01)
          (Continued)

(52) U.S. Cl.
CPC ............ G01S 15/885 (2013.01); G01S 7/539 (2013.01); G01S 15/10 (2013.01); G01S 15/931 (2013.01)

(58) Field of Classification Search
CPC .... G01S 7/52006; G01S 15/885; G01S 7/539; G01S 15/10; G01S 15/931
See application file for complete search history.

(56) References Cited

U.S. PATENT DOCUMENTS 4,249,418 A  *  2/1981  Ebata ................... G01K 11/265
                                                374/E1.004
5,546,813 A  *  8/1996  Hastings ................. G01P 5/245
                                                73/861.29

(Continued)

OTHER PUBLICATIONS

Signal Processing, The difference between convolution and cross-correlation from a signal-analysis point of view (Year: 2015).*

*Primary Examiner* — Abdallah Abulaban
*Assistant Examiner* — Amie M Ndure
(74) *Attorney, Agent, or Firm* — Maginot, Moore & Beck LLP

(57)          ABSTRACT

A method for determining an air temperature for an ultrasonic sensor system, in particular for a vehicle, is disclosed. The method includes determining the intersection points and/or tangential lines and/or tangential planes between the reflection ellipses. If there is a common intersection point and/or a common tangential line and/or a common tangential plane between all reflection ellipses, then identifying the output temperature value as the current air temperature. If there is no common intersection point and/or no common tangential line and/or no common tangential plane between all reflection ellipses, then (i) varying size parameters of the reflection ellipses until a common intersection point and/or a common tangential line and/or a common tangential plane exists between all reflection ellipses, and (ii) calculating a temperature value for the reflection ellipses with a common intersection point and/or a common tangential straight line and/or a common tangential plane and identifying the temperature value as the current air temperature.

15 Claims, 4 Drawing Sheets a)

b)

(51) Int. Cl.
    *G01S 15/88*         (2006.01)
    *G01S 15/931*      (2020.01)

(56)              References Cited

U.S. PATENT DOCUMENTS

| | | | |
|---|---|---|---|
| 5,943,295 A * | 8/1999 | Varga .................. | G06V 40/103 |
| | | | 367/99 |
| 2001/0020777 A1 * | 9/2001 | Johnson ............ | B60R 21/01526 |
| | | | 180/273 |
| 2001/0042976 A1 * | 11/2001 | Breed .................. | B60N 2/2863 |
| | | | 280/735 |
| 2001/0042977 A1 * | 11/2001 | Breed .............. | B60R 21/01538 |
| | | | 280/735 |
| 2002/0089157 A1 * | 7/2002 | Breed .................. | E05F 15/431 |
| | | | 280/735 |
| 2002/0140214 A1 * | 10/2002 | Breed .................. | B60N 2/0026 |
| | | | 280/735 |
| 2005/0192727 A1 * | 9/2005 | Shostak .............. | G07C 5/0808 |
| | | | 701/1 |
| 2006/0025897 A1 * | 2/2006 | Shostak ............ | G06K 19/0717 |
| | | | 701/1 |
| 2007/0075919 A1 * | 4/2007 | Breed ................ | B60R 21/0132 |
| | | | 345/8 |
| 2008/0046149 A1 * | 2/2008 | Breed .................. | B60R 19/483 |
| | | | 701/45 |
| 2010/0207754 A1 * | 8/2010 | Shostak ............. | B60C 23/0433 |
| | | | 340/572.1 |
| 2020/0018506 A1 * | 1/2020 | Ruiz ........................ | F24F 11/46 |
| 2024/0201370 A1 * | 6/2024 | Kuehnle ............ | G01S 7/52006 |

* cited by examiner b)

a)

METHOD FOR DETERMINING AN AIR TEMPERATURE WITH AN ULTRASONIC SENSOR SYSTEM, METHOD FOR DETERMINING A DISTANCE WITH AN ULTRASONIC SENSOR SYSTEM AND ULTRASONIC SENSOR SYSTEM

This application claims priority under 35 U.S.C. § 119 to patent application no. DE 10 2022 213 744.2, filed on Dec. 16, 2022 in Germany, the disclosure of which is incorporated herein by reference in its entirety.

The disclosure relates to a method for determining an air temperature using an ultrasonic sensor system. The disclosure also relates to a method for determining distance using an ultrasonic sensor system. The disclosure also relates to an ultrasonic sensor system, in particular an ultrasonic sensor system for a vehicle.

BACKGROUND

Precise knowledge of the air temperature is essential for distance measurements with ultrasonic sensors. In addition to air pressure and humidity, air temperature is the decisive factor influencing the speed of sound. Incorrectly or inaccurately determined air temperature therefore leads to incorrect or inaccurate distance measurements with ultrasonic systems. In the automotive sector in particular, and especially in the field of autonomous driving, there are high safety requirements for sensor systems. Ultrasonic sensors are therefore subject to high requirements in terms of precision and reliability.

It is therefore a task of the disclosure to provide an improved method for determining an air temperature for an ultrasonic sensor system, in particular for a vehicle, and an improved method for determining distance with an ultrasonic sensor system and an improved ultrasonic sensor system.

This task is solved by the method for determining an air temperature for an ultrasonic sensor system, in particular for a vehicle, by the method for determining distance with an ultrasonic sensor system and by the ultrasonic sensor system disclosed herein. Advantageous configurations are also disclosed herein.

SUMMARY

According to one aspect of the disclosure, there is provided a method for determining an air temperature for an ultrasonic sensor system, in particular for a vehicle, wherein the method comprises:

receiving an output temperature value of an air temperature of an ambient air of an ultrasonic sensor system with at least three ultrasonic sensors;

calculating a speed of sound for ultrasonic signals based on the initial temperature value;

receiving sensor data from the ultrasonic sensors of an ultrasonic signal emitted by one of the at least three ultrasonic sensors and reflected by at least one object;

determining a transit time for each ultrasonic sensor of the ultrasonic signal received by the respective ultrasonic sensor;

calculating a reflection ellipse for each ultrasonic sensor, based on the transit times and the determined speed of sound, wherein the reflection ellipses describe possible positions of the at least one object reflecting the ultrasonic signal in the direction of the respective ultrasonic sensor;

determining the intersection points and/or tangential lines and/or tangential planes between the reflection ellipses;

If there is a common intersection point and/or a common tangential line and/or a common tangential plane between all reflection ellipses, identify the output temperature value as the current air temperature;

If there is no common intersection point and/or no common tangential line and/or no common tangential plane between all reflection ellipses:

varying size parameters of the reflection ellipses until there is a common intersection point and/or a common tangential line and/or a common tangential plane between all reflection ellipses; and calculating a temperature value for the reflection ellipses with a common intersection point and/or a common tangential line and/or a common tangential plane and identifying the temperature value as the current air temperature.

This has the technical advantage that an improved method for determining an air temperature can be provided by an ultrasonic sensor system, in particular for a vehicle. The method involves using ultrasonic measurements of an ultrasonic sensor system with at least three ultrasonic sensors to determine an air temperature of the ambient air of the ultrasonic sensor system. For this purpose, a speed of sound for ultrasonic signals is first calculated based on an initial temperature value for the air temperature of the ambient air. Subsequently, ultrasonic signals are emitted by one of the three ultrasonic sensors and signals reflected from an object are received by all three ultrasonic sensors. Based on the received ultrasonic signals, transit times of the ultrasonic signals between the time of transmission and the time of reception of the transmitted or received ultrasonic signal are calculated. Based on the transit times, reflection ellipses are calculated for each of the at least three ultrasonic sensors. The reflection ellipses describe point sets of possible positions at which the reflecting object can be arranged relative to the respective ultrasonic sensor. Intersection points and/or tangential lines and/or tangential planes between the at least three reflection ellipses are then determined.

The intersection points and/or tangential lines and/or tangential planes are calculated for at least two of the reflection ellipses. The tangential lines or tangential planes are lines or planes that touch each reflection ellipse at a maximum of one point of contact. Primarily tangential lines or tangential planes are taken into account, which are arranged in front of the ultrasonic sensors in the direction of the reflecting object.

With a correct output temperature value that corresponds to the actual air temperature of the ambient air, the calculated speed of sound of ultrasonic signals corresponds to the actual speed of sound of the emitted or received ultrasonic signals.

Based on the measured transit times, the actual distances of the reflecting object to the at least three different ultrasonic sensors can thus be calculated, taking into account the calculated speed of sound. With an exact distance determination based on the correct initial temperature, the intersection points of the reflection ellipses are a common intersection point and/or the tangential lines and/or tangential planes coincide with a common tangential line and/or a common tangential plane. Similarly, the tangential lines and/or tangential planes are a common tangential line and/or a common tangential plane.

The course of the tangential straight line and/or the tangential plane can correspond to the course of a reflective surface of a planar reflecting object.

The coincidence of the intersection points of the reflection ellipses into a common intersection point describes the case of a reflection on a point-shaped or almost point-shaped reflecting object. The coincidence of the tangential lines and/or tangential planes into a common tangential line and/or tangential plane describes the case of a planar reflecting object.

The common intersection point describes the actual position of the point-shaped reflecting object, while the common tangential line and/or tangential surface describes the position of the reflective surface of the object.

If a common intersection point and/or a common tangential line and/or a common tangential surface is determined when determining the intersection points and/or tangential lines and/or tangential surfaces between the three reflection ellipses, the output temperature value is interpreted as the actual prevailing air temperature of the ambient air.

However, if the at least three reflection ellipses have several intersection points and/or tangential lines and/or tangential planes, this indicates an incorrect initial temperature that does not correspond to the actual air temperature of the ambient air. Due to the incorrect assumption of the ambient air temperature by the initial temperature value, an incorrect speed of sound of the ultrasonic signals is also calculated. Based on the incorrect speed of sound of the ultrasonic signals, incorrect distance values for the reflecting object have been determined for the measured transit times of the ultrasonic signals.

The incorrect distance values find expression in reflection ellipses with incorrect size parameters. If the assumed air temperature is too high, the speed of sound of the ultrasonic signals is calculated to be too high and the respective distance of the reflecting object is also calculated to be too high. This leads to reflection ellipses with increased size parameters. If, on the other hand, the temperature of the ambient air is assumed to be too low due to the initial temperature value, this leads to an excessively low speed of sound and correspondingly low distance values of the reflecting object, which in turn find expression in reflection ellipses with insufficient size parameters. Reflection ellipses with too large or too small size parameters, which therefore overestimate or underestimate the distance of the reflecting object, therefore have no common intersection points and/or tangential lines and/or tangential planes.

The at least three ultrasonic sensors are spaced apart from each other. This enables a triangulation method thanks to the three independent ultrasonic measurements of the three ultrasonic sensors. This means that if the distance is determined incorrectly based on the three individually carried out ultrasonic measurements, no clear position of the reflecting object can be determined. This finds expression in the three reflection ellipses, which each describe possible positions of the reflecting object relative to the respective ultrasonic sensors, not having any common intersection points and/or tangential lines and/or tangential planes.

For such a case, in which no common intersection point and/or no common tangential line and/or no common tangential plane is observed, the method provides for the size parameters of the three reflection ellipses to be adjusted in such a way that a common intersection point and/or a common tangential line and/or a common tangential plane is achieved. The adjustment of the size parameters of the reflection ellipses corresponds to an adjustment of the speed of sound of the ultrasonic signals, in which a larger speed of sound is assumed when the size parameters of the reflection ellipses are increased and a reduced speed of sound is assumed when the size parameters are reduced. A change in the speed of sound in turn corresponds to a change in the air temperature of the ambient air.

According to the disclosure, the actual air temperature of the ambient air is thus identified as the temperature value corresponding to the three reflection ellipses which have a common intersection point and/or a common tangential line and/or a common tangential plane.

By geometrically adjusting the size parameters of the at least three reflection ellipses until a common intersection point and/or a common tangential line and/or a common tangential plane of the at least three reflection ellipses is determined, the actual air temperature of the ambient air can be precisely determined. The disclosure is based on the idea that a correct speed of sound of the ultrasonic signals can be calculated if the actual prevailing air temperature of the ambient air is correctly assumed. Based on the transit time measurements of the ultrasonic measurements of the ultrasonic signals and the calculated speed of sound, correct distances of the reflecting object to the at least three ultrasonic sensors and, based on this, correct reflection ellipses can be determined.

The disclosure assumes that when the distance of the object to the various ultrasonic sensors is determined correctly, the correctly calculated reflection ellipses have a common intersection point and/or a common tangential line and/or a common tangential plane.

The method can be carried out in the garage, for example, at the start of the journey of the vehicle. Here, the contours of the garage walls are known as reflective surfaces. Alternatively, the method can be carried out on any reflecting object for which the contours or courses of the reflective surfaces are known.

Alternatively, an environment detection based on environment sensor data can be carried out before the method is carried out and the objects arranged in the environment of the ultrasonic sensor can be detected. This makes it possible to precisely determine the course of the reflective surfaces of the objects. For example, image data from a camera sensor can be used to carry out environment detection based on appropriately trained artificial intelligence and the objects in the environment can be detected, recognized and the contours of the surfaces of the objects determined. This information can then be used to determine the intersection points and/or the tangential line and/or the tangential plane of the reflection ellipses and to check whether these can be transferred to a common intersection point and/or a common tangential line and/or a common tangential plane.

According to one embodiment, the calculation of the temperature value comprises:

calculating a speed of sound for the reflection ellipses based on the travel times of the ultrasonic signals and travel distances of the ultrasonic signals based on the size parameters of the reflection ellipses; and calculating the temperature value based on the speed of sound.

This has the technical advantage that it is possible to precisely determine the temperature value of the air temperature based on the size parameters of the at least three reflective ellipses intersecting at one point. By varying the size of the reflective ellipses, this allows the actual air temperature of the ambient air to be determined precisely.

According to one embodiment, the above steps are repeated until for configurations in which each of the ultrasonic sensors acts as a transmitter of the ultrasonic signal and the respective other ultrasonic sensors act only as receivers of the ultrasonic signal.

This can achieve the technical advantage that the reflecting object can be illuminated from different perspectives by carrying out the method described above for different configurations in which one of the at least three ultrasonic sensors is the transmitter of the ultrasonic signals and the other two of the at least three ultrasonic sensors merely act as receivers of the ultrasonic signals. This makes it possible to exclude geometric aspects of the reflecting object that can lead to distortions of the position determination by the intersection point determination and/or the tangential straight line and/or tangential plane determination of the reflection ellipses.

By emitting the ultrasonic signals from the at least three different directions of the at least three different ultrasonic sensors, a clear position can be determined. If the reflective surface of the reflecting object is known, this enables the air temperature of the ambient air to be determined precisely, based on the intersection point determinations and/or the tangential straight line and/or tangential plane determinations of the reflection ellipses.

According to one embodiment, the above steps are carried out for an additional fourth ultrasonic sensor.

The technical advantage of this is that the fourth ultrasonic sensor can be used to incorporate an additional third spatial dimension into the determination of the object's position. This increases the precision of the temperature determination.

According to one embodiment, the output temperature value is a measured value from a temperature sensor.

This has the technical advantage that a precise output temperature value can be provided. It is particularly helpful that it is the temperature in the air area through which the ultrasonic signals propagate.

According to one embodiment, the method is carried out cyclically, wherein the initial temperature value corresponds to the current air temperature determined in a previous execution cycle.

This can achieve the technical advantage that the respective output temperature can be further specified in the form of the output temperature value by cyclically carrying out the method steps described above.

According to one embodiment, the size parameters of the reflection ellipses are given by small half-axes and large half-axes of the reflection ellipses.

This has the technical advantage that the size parameters can be determined precisely. The corresponding size parameters enable a uniform variation of the at least three reflection ellipses and thus a precise variation of the output temperature value of the ambient air.

According to one embodiment, the reflection ellipse of the transmitting ultrasonic sensor is designed as a circle, wherein the reflection ellipses of the exclusively receiving ultrasonic sensors are configured in such a way that the respective exclusively receiving ultrasonic sensor and the transmitting ultrasonic sensor are arranged at the focal points of the reflection ellipse.

This has the technical advantage that meaningful reflection ellipses can be provided for calculating the distance of the reflecting object.

According to a further aspect, a method for determining distance using an ultrasonic sensor system with at least three ultrasonic sensors is provided, comprising:

carrying out the method of determining an air temperature for an ultrasonic sensor system according to any of the preceding embodiments and determining the air temperature;

determining a distance of an object based on a transit time measurement of ultrasonic signals from the ultrasonic sensors, taking into account the determined air temperature.

Hereby, the technical advantage can be achieved that an improved method for distance determination with an ultrasonic sensor system is provided, wherein the method provides a temperature determination according to the method for temperature determination according to the disclosure with the technical advantages described above.

According to a further aspect, a calculating unit is provided which is configured to carry out the method for determining an air temperature for an ultrasonic sensor system according to one of the preceding embodiments and/or the method according to the disclosure for determining a distance using an ultrasonic sensor system having at least three ultrasonic sensors.

According to a further aspect, there is provided a computer program product comprising instructions which, when the program is executed by a data processing unit, cause the data processing unit to carry out the method for determining an air temperature for an ultrasonic sensor system according to one of the preceding embodiments and/or the method for determining a distance according to the disclosure with an ultrasonic sensor system comprising at least three ultrasonic sensors.

According to a further aspect, an ultrasonic sensor system, in particular for a vehicle, is provided with at least three ultrasonic sensors and a calculating unit according to the disclosure.

In this way, the technical advantage can be achieved that an improved ultrasonic sensor system can be provided which is configured to carry out the method for temperature determination according to the disclosure and/or the method for distance determination according to the disclosure with the technical advantages described above.

BRIEF DESCRIPTION OF THE DRAWINGS

Embodiment examples of the disclosure are explained with reference to the following drawings. Shown in the drawings are.

DETAILED DESCRIPTION

Figure 1:
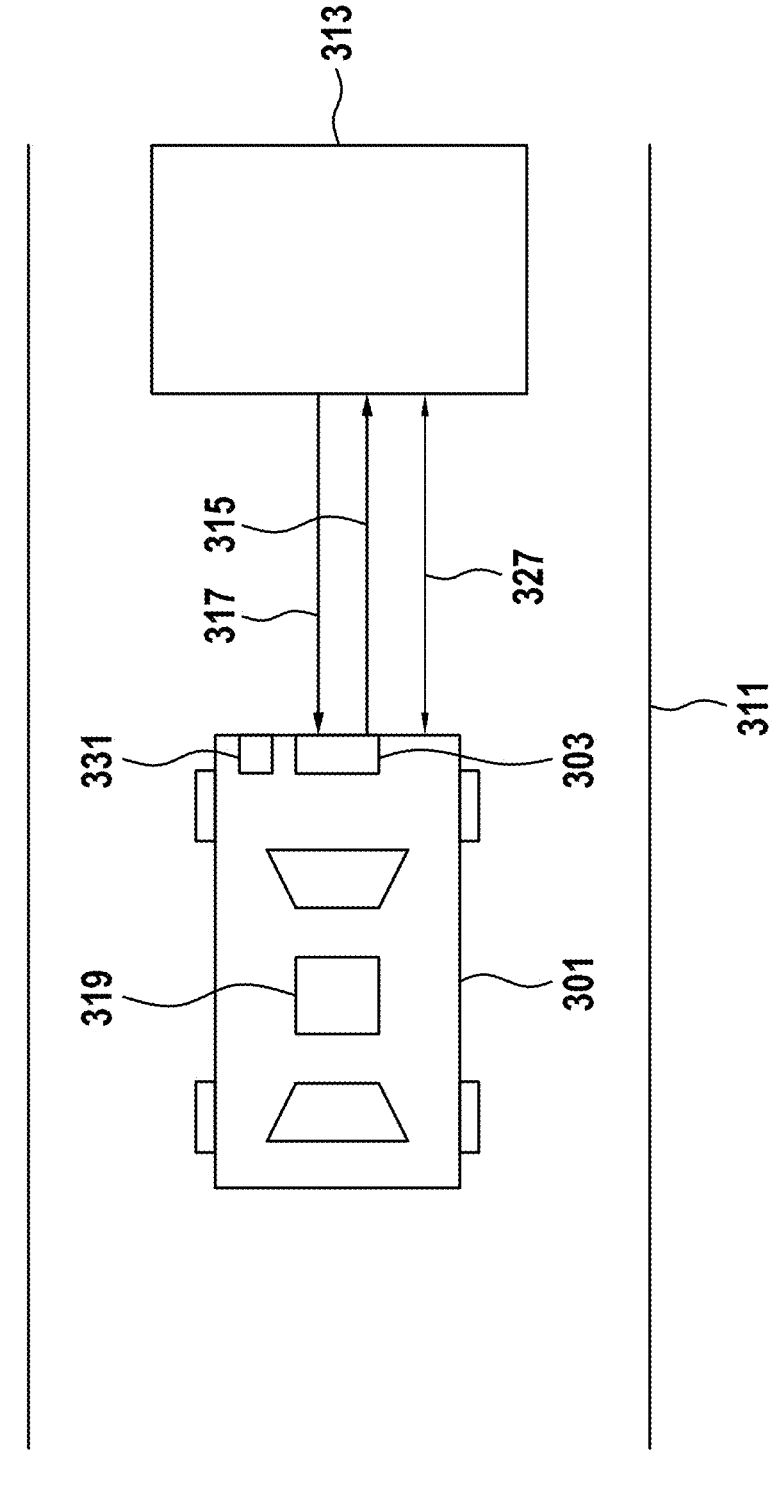
FIG. 1 a schematic representation of a system for determining an air temperature for an ultrasonic sensor system.

FIG. 1 shows a schematic representation of a system 300 for determining an air temperature for an ultrasonic sensor system 303.

FIG. 1 shows a vehicle 301 traveling on a roadway 311. The vehicle comprises an ultrasonic sensor system 303 according to the disclosure. The ultrasonic sensor system comprises at least three ultrasonic sensors not shown in FIG. 1. The ultrasonic sensors are configured to emit ultrasonic signals and receive ultrasonic signals reflected from objects.

The vehicle 301 further comprises a calculating unit 319. The calculating unit 319 is configured to carry out the method according to the disclosure for determining an air temperature for an ultrasonic sensor system 303 and/or the method according to the disclosure for determining a distance with an ultrasonic sensor system 303.

The vehicle 301 further comprises a temperature sensor 331. The temperature sensor 331 is adjacent to the ultrasonic sensor system 303, designed and configured to measure a temperature of the ambient air of the ultrasonic sensor system 303.

Furthermore, an object 313 is arranged on the roadway 311 at a distance 327 from the vehicle 301. By transmitting ultrasonic signals 315 and receiving ultrasonic signals 317 reflected on at least one reflective surface of the object 313 and by determining a transit time of the signals between transmission and reception, the distance 327 to the object can be determined according to methods known from the prior art.

Figure 2:
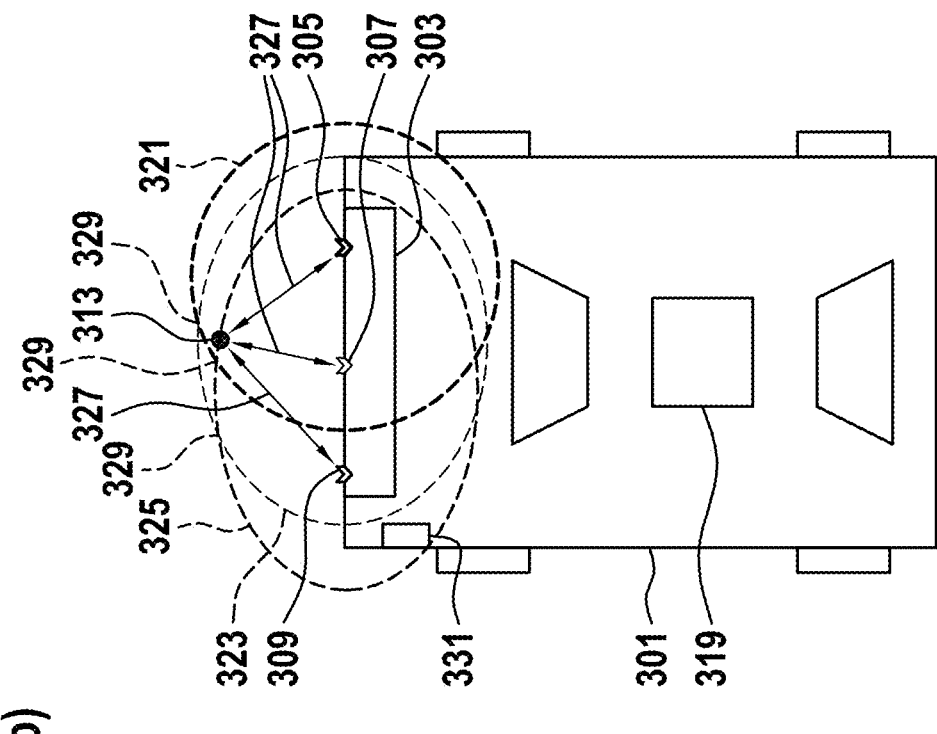
FIG. 2 another graphical representation of the system for determining an air temperature for an ultrasonic sensor system.
Figure 2:
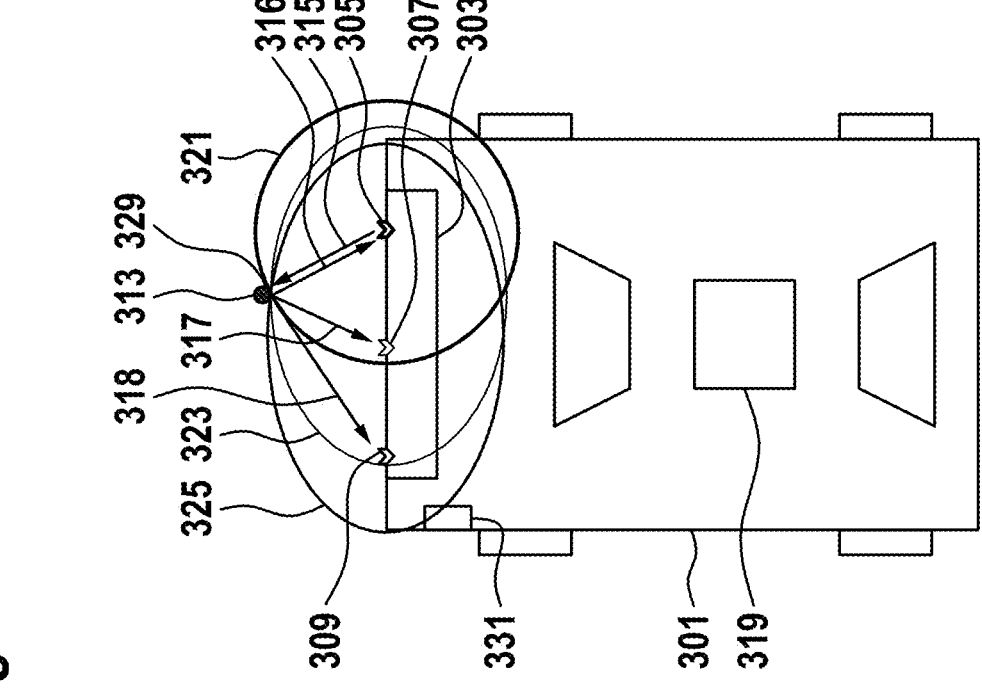

FIG. 2 shows a further graphical representation of the system 300 for determining an air temperature for an ultrasonic sensor system 303.

In FIG. 2, the concept of the method 100 according to the disclosure is described with reference to a point-shaped reflecting object 313. The special feature of the point-shaped object 313 is that the at least three reflection ellipses of the at least three ultrasonic sensors have a common point of intersection point 329 if the air temperature is correctly assumed and the speed of sound connected with it is correctly determined. This is an exceptional case of the general case in which the ultrasonic signals are reflected by an extended planar object 313. In such a case, tangential lines or tangential planes, both not shown in FIG. 2, are taken into account for the reflection ellipses instead of intersection points.

The procedure of the method according to the disclosure described in FIG. 2 for the case of a point-shaped or almost point-shaped object can also be transferred to extended planar objects. In such a case, tangential lines and/or tangential planes of the reflection ellipses are calculated and parameters of the ellipses are changed in such a way that the tangential lines and/or tangential planes coincide to a common tangential line and/or tangential plane.

FIG. 2 shows the vehicle 301 from FIG. 1. The vehicle comprises the ultrasonic sensor system 303. In the embodiment shown, the ultrasonic sensor system comprises a first ultrasonic sensor 305, a second ultrasonic sensor 307 and a third ultrasonic sensor 309, each of which is arranged at a distance from one another. The three ultrasonic sensors 305, 307, 309 can each transmit ultrasonic signals 315 or receive ultrasonic signals 316, 317, 318 that were previously reflected by objects 313 in the environment of the ultrasonic sensor system 303.

Using the two graphs a) and b) of FIG. 2, steps of the method according to the disclosure for determining a temperature value of an air temperature of the ambient air of the vehicle 301 or of the environment sensor system 303 are described below.

To determine the distance via ultrasonic measurements by determining transit times of ultrasonic signals 315 emitted by the ultrasonic sensors 305, 307, 309 and receiving ultrasonic signals 316, 317, 318 reflected from objects 313, the assumption of a speed of sound of ultrasonic signals is required. Only by knowing the speed of sound can a distance of the reflecting object be calculated by measuring the transit time of the ultrasonic signals. The speed of sound of the ultrasonic signals is substantially dependent on the air temperature of the ambient air of the ultrasonic sensors.

Precise distance determination using ultrasonic measurements therefore requires precise knowledge of the ambient air temperature.

According to the disclosure, an output temperature value of the air temperature of the ambient air is first received by the calculating unit 319. The initial temperature value serves as the first assumption for the air temperature of the ambient air. The output temperature value can, for example, be a measured value of the air temperature of the temperature sensor 331. Based on the initial temperature value for the air temperature of the ambient air, a corresponding speed of sound for ultrasonic signals can be calculated.

Based on this, an ultrasonic measurement is carried out by the ultrasonic sensors 305, 307, 309 of the ultrasonic sensor system 303. According to the disclosure, an ultrasonic signal 315 is emitted by only one of the three ultrasonic sensors 307, 309. However, all of the at least three ultrasonic sensors 305, 307, 309 of the ultrasonic sensor system 303 are used to receive the ultrasonic signals 316, 317, 318 reflected from the object 313 positioned in the environment of the vehicle 301. In the embodiment shown in graphs a) and b), the first ultrasonic sensor 305 serves as a transmitter of the emitted ultrasonic signal 315. However, all three ultrasonic sensors 305, 306, 307 receive an ultrasonic signal 316, 317, 318 reflected by the object 313.

Based on the received ultrasonic signals of the three ultrasonic sensors 305, 306, 307, the calculating unit 319 calculates a transit time of the different signals between the transmission by the first ultrasonic sensor 305 and the reception by the respective ultrasonic sensors 305, 307, 309.

Based on the measured transit times of the ultrasonic signals and taking into account the speed of sound of the ultrasonic signals calculated on the basis of the temperature output value of the air temperature of the ambient air, a reflection ellipse 321, 323, 325 is then calculated by the calculating unit 319 for each of the three ultrasonic sensors 305, 306, 307. The reflection ellipses 321, 323, 325 describe possible positions of the reflecting object 313 relative to the respective ultrasonic sensors 305, 307, 309. As ultrasonic measurements do not have an angular resolution, it is not possible to determine a clear position based on measurements from a single ultrasonic sensor. Ultrasonic measurements allow only the distance of the object to the respective ultrasonic sensor to be determined.

For the first ultrasonic sensor 305 acting as a transmitter, the reflection ellipse 321 is thus designed as a circle. The circle points of the first reflection ellipse 321 describe possible positions of the object 313 relative to the first ultrasonic sensor 305.

In contrast, the second and third reflection ellipses 323, 325 of the second and third ultrasonic sensors 307, 309, which merely serve as receivers of the emitted ultrasonic signals 315, are designed such that the emitting first ultrasonic sensor 305 and the respective ultrasonic sensor 307, 309 are arranged in the focal points of the respective reflection ellipse 323, 325. The points of the reflection ellipses 323, 325 thus describe possible positions of the object 313 relative to the respective ultrasonic sensor 307, 309. For individual points on the respective ellipses 323, 325, the total transit time of the respective emitted ultrasonic signal 315 and the respective ultrasonic signal 317, 318 reflected by the object 313 and received by the respective ultrasonic sensor 307, 309 is identical.

The size of the reflection ellipses 321, 323, 325 describe the determined distance of the reflecting object 313. For example, the radius of the first reflection ellipse 321 of the acting first ultrasonic sensor 305, which is designed as a circle, describes the distance of the object 313 to the first ultrasonic sensor 305.

The size ratios of the reflection ellipses 321, 323, 325 shown here depend on the previously calculated or assumed speed of sound for ultrasonic signals. With a higher assumed speed of sound, a greater distance of the object 313 to the respective ultrasonic sensor 305, 307, 309 is calculated for a measured transit time of the ultrasonic signals. With a lower assumed speed of sound, on the other hand, a shorter distance between the object and the respective ultrasonic sensor is calculated while the transit time of the ultrasonic signals remains the same.

Due to the relationship between the speed of sound of the ultrasonic signals and the prevailing air temperature of the ambient air, there is thus a relationship between the sizes of the calculated reflection ellipses 321, 323, 325 and the air temperature of the ambient air assumed via the initial temperature value. If the initial temperature value of the air temperature of the ambient air deviates from the actual air temperature of the ambient air, the speed of sound for ultrasonic signals calculated based on the initial temperature value also deviates from the actual prevailing speed of sound and the reflection ellipses 321, 323, 325 used for the distance calculation also do not describe the correct distance of the reflecting object 313 to the respective ultrasonic sensor 305, 307 309.

If the air temperature is assumed to be correct, i.e. if the initial temperature value corresponds to the actual air temperature of the ambient air, and if the speed of sound of the ultrasonic signals is calculated correctly on this basis, the various reflection ellipses 321, 323, 325 describe the correct distance of the reflecting object 313 to the respective ultrasonic sensor 305, 307, 309.

Due to the spaced arrangement of the at least three ultrasonic sensors 305, 307, 309 relative to one another, a triangulation method can be carried out by means of the individual distance determinations of the various ultrasonic measurements of the ultrasonic sensors 305, 307, 309, by means of which a position determination of the reflecting object 313 relative to the ultrasonic sensor system 303 is made possible. Graph a) shows such a situation in which a correct distance determination of the reflecting object 313 could be achieved due to correct assumptions of the speed of sound, based on a correct assumption of the air temperature of the ambient air.

Based on the triangulation method, the position of the reflecting object 313 can be clearly determined for such a case. Since the reflected ultrasonic signals 316, 317, 318 received by the three ultrasonic sensors 305, 307 originate from the same reflecting object 313, the reflecting object 313 can be positioned only at the common intersection point 329 of the three reflection ellipses 321, 323, 325.

This basic assumption that with correct determination of the speed of sound and thus with correct assumption of the air temperature of the ambient air and thus with correct calculation of the distance of the reflecting objects to the respective ultrasonic sensors 305, 307, 309, the respective reflecting object 313 must be positioned in a common intersection point 329 of the reflection ellipses 321, 323, 325, can be used for a temperature determination of the air temperature of the ambient air via the calculation of reflection ellipses 321, 323, 325.

As already mentioned above, the graphs a) and b) show the simplified case of a point-shaped reflecting object 313. For an extended object 313 with at least one extended reflective surface, tangential lines and/or tangential planes are calculated instead of the intersection points, each of which has at most one point of contact with a reflection ellipse.

Graph b) describes a case in which the distance of the object 313 relative to the ultrasonic sensors 305, 307, 309 is incorrectly determined. The incorrect distance determination can, for example, be based on an incorrect assumption of the prevailing speed of sound for ultrasonic signals and thus on an incorrect assumption of the existing air temperature of the ambient air.

Due to the incorrect distance determination, the shown reflection ellipses 321, 323, 325 have incorrect size proportions. As a result, the three reflection ellipses 321, 323, 325 shown do not have a common intersection point 329 at which all three reflection ellipses 321, 323, 325 intersect. Instead, graph b) shows three different intersection points 329, in each of which only two of the three reflection ellipses 321, 323, 325 intersect.

In the graph b) shown, the first reflection ellipse 321 and the second reflection ellipse 323 are each too large and therefore assume that the object 313 is too far away from the respective sensor 305, 307.

For a case of an extended reflecting object 313, if the air temperature is incorrectly assumed and/or the speed of sound is incorrectly determined, the tangential straight lines and/or the tangential plane do not coincide to form a common tangential straight line and/or a common tangential plane. Instead, each pair of reflection ellipses 325, 327, 329 has an individual tangential straight line and/or tangential plane that differs from the respective other tangential straight lines and/or tangential planes. The tangential straight lines and/or tangential planes differ in their positions and/or orientations and are arranged at an angle to each other. The tangential lines and/or tangential planes that deviate from each other can have intersection points or intersection lines with each other.

According to the disclosure, in such a case in which the distance determination is obviously incorrect, since there is no clear common intersection point and/or no common tangential line and/or no common tangential plane between the at least three reflection ellipses 321, 323, 325 and thus an incorrect assumption of the existing speed of sound or a lack of correspondence of the output temperature value with the actually existing air temperature of the ambient air is to be assumed, a variation of the size parameters of the at least three reflection ellipses 321, 323, 325 is carried out. The reflection ellipses 321, 323, 325 are thus varied in size in such a way that a common intersection point and/or a common tangential straight line and/or a common tangential plane of the at least three reflection ellipses is achieved.

As described above, with a common intersection point and/or a common tangential line and/or a common tangential plane of the three reflection ellipses, a correct distance determination of the distance of the reflecting object 313 to the respective ultrasonic sensors 305, 307, 309 can be assumed due to the triangulation. If, by varying the size parameters of the three reflection ellipses 321, 323, 325, reflection ellipses are generated which have a common intersection point 329 and/or a common tangential straight line and/or a common tangential plane, it can be assumed that a correct distance determination and, associated with this, a correct determining of the speed of sound or a correct assumption of the existing air temperature of the ambient air is present.

After successfully varying the size parameters of the reflection ellipses 321, 323, 325 and achieving a common intersection point 329 and/or a common tangential straight line and/or a common tangential plane of the three reflection ellipses 321, 323, a temperature value corresponding to the reflection ellipses 321, 323, 325 is determined by the calculating unit 319 according to the disclosure and interpreted as the actual air temperature of the ambient air. For this purpose, a speed of sound of the ultrasonic signals can be calculated by the calculating unit for the three reflection ellipses 321, 323, 325, based on the measured transit times of the ultrasonic signals 315, 316, 317, 318 and the corresponding determination of the distance of the respective reflection ellipses 321, 323, 325.

By knowing the transit time of the individual ultrasonic signals 315, 316, 317, 318 between the transmission by the first ultrasonic sensor 305 and the reception by the respective receiving ultrasonic sensor 305, 307, 309 and by knowing the respective distance of the reflecting object 313 to the respective ultrasonic sensor 305, 307, 309, the present speed of sound of the ultrasonic signals 315, 316, 317, 318 can be calculated. Based on the calculated speed of sound, the temperature of the ambient air can also be calculated.

For this purpose, the calculating unit 319 can, for example, access corresponding databases in which the relationship between air temperature and the speed of sound of ultrasonic signals is stored. The respective database can also contain relations to air pressure or humidity.

Alternatively, the speed of sound can also be calculated using formulas known from the prior art based on the measured transit times of the ultrasonic signals and the distance information determined based on the reflection ellipses.

By varying the parameters of the reflection ellipses and generating a common intersection point 329 and/or a common tangential line and/or a common tangential plane, a precise determination of the air temperature of the ambient air can thus be achieved.

The corresponding size parameters of the reflection ellipses 321, 323, 325 can be given, for example, by large half-axes and small half-axes of the ellipses or radii of the reflection ellipses 321, 323, 325 designed as a circle.

The described method for temperature determination can further be carried out for various configurations in which, in addition to the embodiment shown in graphs a) and b), the second and third ultrasonic sensors 307, 309 respectively act as transmitters of the ultrasonic signals 315, while the respective other ultrasonic sensors are used exclusively as receivers. This allows the emitted ultrasonic signals 315 to hit the reflecting object 313 from different directions.

In this way, surface properties or geometric properties of the object 313 that can influence the reflection behavior of the object 313 can be taken into account or excluded. By measuring the at least three ultrasonic sensors 305, 307, 309, the position of the object 313 can be clearly determined with respect to two spatial directions.

An additional fourth ultrasonic sensor can be used to clearly determine the position of the object 313 with respect to all three spatial directions. The method described is therefore carried out analogously for four ultrasonic sensors.

According to one embodiment, the method described above for determining the air temperature of the ambient air can be carried out cyclically. The initial temperature value of an execution cycle can be given by the value of the actual air temperature determined in the previous execution cycle.

In deviation from the embodiments shown in FIG. 1 and FIG. 2, the ultrasonic sensor system 303 can comprise any number of at least three ultrasonic sensors. In deviation from the embodiments shown, the method shown can also be used for ultrasonic sensor systems 303 that are used in an application area other than the automotive sector.

When using only three ultrasonic sensors 305, 307, 309, the method 100 according to the disclosure is primarily applicable for flat reflective surfaces of the reflecting object 313. Curvatures of the reflective surface cannot be determined by the maximum of two intersection points 329 of the three reflection ellipses 321, 323, 325 of the three ultrasonic sensors 305, 307, 309.

However, the method can be extended to any number of ultrasonic sensors. With a correspondingly high number, curvatures of the reflective surfaces of the reflecting object 313 can be taken into account when checking the intersection points and/or tangential straight lines and/or tangential planes of the respective reflection ellipses.

Figure 3:
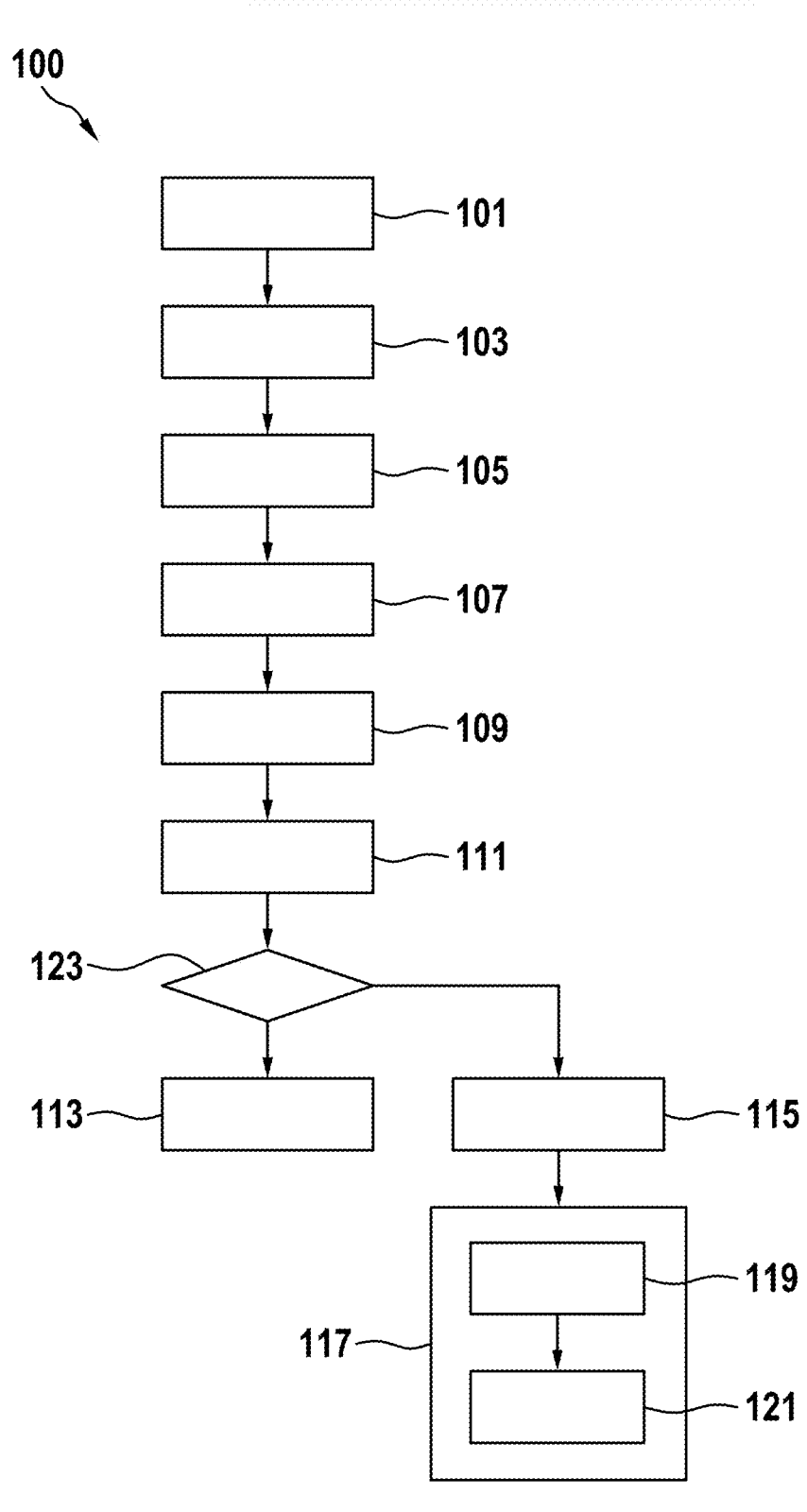
FIG. 3 a flow diagram of a method for determining an air temperature for an ultrasonic sensor system.

FIG. 3 shows a flow diagram of a method 100 for determining an air temperature for an ultrasonic sensor system 303.

According to the disclosure, an initial temperature value of an air temperature of the ambient air of the ultrasonic sensor system 303 is first received in a first method step 101.

In a further method step 303, a speed of sound for ultrasonic signals 315, 316, 317, 318 is calculated based on the initial temperature value.

In a further method step 105, sensor data from the ultrasonic sensors 305, 307, 309 of an ultrasonic signal emitted by one of the ultrasonic sensors 305, 307, 309 and reflected from at least one object 313 is received.

In a further method step 107, a transit time of the ultrasonic signal 316 to 318 received by the respective ultrasonic sensor 305, 307, 309 is determined for each of the ultrasonic sensors 305, 307, 309.

In a further method step 109, a reflection ellipse 321, 323, 325 is calculated for each ultrasonic sensor 305, 307, 309 based on the transit times of the ultrasonic signals and the determined speed of sound. The reflection ellipses 321, 323, 325 describe possible positions of the reflecting object 313 relative to the respective ultrasonic sensor 305, 307, 309.

In a further method step 111, intersection points 329 and/or tangential straight lines and/or tangential planes between the reflection ellipses 321, 323, 325 are determined.

In a further method step 123, it is checked whether there is a common intersection point 329 and/or a common tangential straight line and/or a common tangential plane of the at least three reflection ellipses 321, 323, 325.

In a further method step 113, the output temperature value is identified as the current air temperature if there is a common intersection point 329 and/or a common tangential straight line and/or a common tangential plane of the at least three reflection ellipses 321, 323, 325.

If there is no common intersection point 329 and/or no common tangential line and/or no common tangential plane between the reflection ellipses 321, 323, 325, a variation of the size parameters of the reflection ellipses 321, 323, 325 is carried out in a further method step 115 until reflection ellipses 321, 323, 325 are generated which have a common intersection point 329 and/or a common tangential line and/or a common tangential plane.

Furthermore, in a further method step 117, a temperature value for the reflection ellipses 321, 323, 325 with a common intersection point 329 and/or common tangential line and/or common tangential plane is calculated and identified with the current air temperature of the ambient air.

For this purpose, in a method step 119, a speed of sound for ultrasonic signals is calculated for the reflection ellipses 321, 323, 325, based on the transit times of the ultrasonic signals 315, 316, 317, 318 and the paths of the ultrasonic signals 315, 316, 317, 318, based on the size parameters of the reflection ellipses 321, 323, 325.

In a further method step 121, the temperature value is calculated based on the speed of sound.

Figure 4:
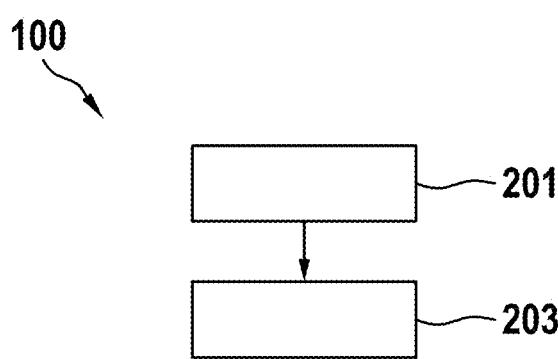
FIG. 4 a flow diagram of a method for determining distance using an ultrasonic sensor system.

FIG. 4 shows a flow diagram of a method 200 for determining distance using an ultrasonic sensor system 303.

In a first method step 201, the method 100 according to the disclosure for determining an air temperature for an ultrasonic sensor system 303 according to the embodiments described above is first carried out and a corresponding air temperature is determined.

In a further method step 203, a distance 327 of the object 313 is determined based on the transit time measurements of the ultrasonic signals 315 to 319 of the ultrasonic sensors 305, 307, 309, taking into account the determined air temperature.

Figure 5:
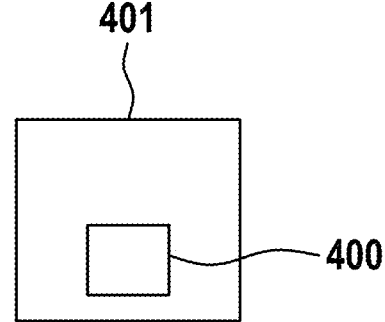
FIG. 5 a schematic representation of a computer program product.

FIG. 5 shows a schematic representation of a computer program product 400 comprising instructions that, when the program is executed by a computing device, cause the calculating unit to carry out the method 100 for determining an air temperature for an ultrasonic sensor system 303 and/or the method 200 for determining distance with an ultrasonic sensor system 303.

The computer program product 400 is stored on a storage medium 401 in the embodiment shown. The storage medium 401 can be any storage medium known from the prior art.

What is claimed is:

1. A method for determining an output air temperature for an ultrasonic sensor system for a vehicle, comprising:
  (a) receiving an initial temperature value of an ambient air temperature of the ultrasonic sensor system having at least three ultrasonic sensors;
  (b) calculating a speed of sound based on the initial temperature value;
  (c) receiving sensor data of a corresponding ultrasonic signal emitted by the at least three ultrasonic sensors and reflected from at least one object;
  (d) determining a transit time for each ultrasonic sensor based on the corresponding ultrasonic signal;
  (e) calculating a reflection ellipse for each ultrasonic sensor based on the transit times and the calculated speed of sound, wherein the reflection ellipses describe possible positions of the at least one object reflected by the corresponding ultrasonic signal in a direction of a respective ultrasonic sensor of the at least three ultrasonic sensors;
  (f) determining intersection points, tangential lines, and/or tangential planes between the reflection ellipses;
  (g) when there is a common intersection point, a common tangential line, and/or a common tangential plane between all reflection ellipses, identifying the initial temperature value as the output air temperature; and
  (h) when there is no common intersection point, no common tangential line, and/or no common tangential plane between all reflection ellipses, (i) varying size parameters of the reflection ellipses until an adjusted common intersection point, an adjusted common tangential line, and/or an adjusted common tangential plane exists between all reflection ellipses; and (ii) calculating a calculated temperature value for the reflection ellipses with the adjusted common intersection point, the adjusted common tangential line, and/or the adjusted common tangential plane, and identifying the calculated temperature value as the output air temperature.

2. The method according to claim 1, wherein calculating the calculated temperature value comprises:
  (i) calculating an adjusted speed of sound for the reflection ellipses based on the transit times of the ultrasonic signals and travel distances of the ultrasonic signals based on the varied size parameters of the reflection ellipses; and
  (j) calculating the calculated temperature value based on the adjusted speed of sound.

3. The method according to claim 2, wherein steps (c) to (j) are repeated for configurations in which each of the at least three ultrasonic sensors acts as a transmitting ultrasonic sensor configured to transmit the corresponding ultrasonic signal while two other ultrasonic sensors act only as receivers of the corresponding ultrasonic signal.

4. The method according to claim 3, wherein the steps (c) to (j) are carried out for an additional fourth ultrasonic sensor.

5. The method according to claim 3, wherein:
  the reflection ellipse of the transmitting ultrasonic sensor is a circle, and
  the reflection ellipses of the two other ultrasonic sensors are configured such that the two other ultrasonic sensors and the transmitting ultrasonic sensor are arranged at focal points of the reflection ellipse.

6. The method according to claim 1, wherein the initial temperature value is a measured value of a temperature sensor.

7. The method according to claim 1, wherein:
  the method is carried out cyclically, and
  the initial temperature value corresponds to the output air temperature determined in a preceding execution cycle.

8. The method according to claim 1, wherein the size parameters of the reflection ellipses comprise small half-axes and large half-axes of the reflection ellipses.

9. A method for determining distance using an ultrasonic sensor system, comprising:
  carrying out a method, according to claim 1, for determining an output air temperature for the ultrasonic sensor system and determining the output air temperature; and
  determining a distance of another object from the ultrasonic sensor system based on (i) a transit time of a corresponding ultrasonic signal for each ultrasonic sensor of the ultrasonic sensor system, and (ii) the output air temperature.

10. The method according to claim 9, wherein a data processing unit is configured to carry out the method for determining distance using the ultrasonic sensor system.

11. A calculating unit configured to carry out a method, according to claim 1, for determining an output air temperature for an ultrasonic sensor system for a vehicle.

12. The method according to claim 1, wherein a data processing unit is configured to carry out the method for determining the output air temperature for the ultrasonic sensor system for the vehicle.

13. An ultrasonic sensor system, comprising:
  at least three ultrasonic sensors, and
  a calculating unit according to claim 11.

14. A calculating unit configured to carry out a method, according to claim 9, for determining distance using an ultrasonic sensor system.

15. An ultrasonic sensor system, comprising:
  at least three ultrasonic sensors, and
  a calculating unit according to claim 14.

* * * * *